(12) United States Patent
Meng et al.

(10) Patent No.: US 10,279,762 B2
(45) Date of Patent: May 7, 2019

(54) SYSTEMS AND METHODS FOR USING MOBILE DEVICES TO CONTROL ON-BOARD DEVICES OF VEHICLES

(71) Applicant: BEIJING DIDI INFINITY TECHNOLOGY AND DEVELOPMENT CO., LTD., Beijing (CN)

(72) Inventors: Yang Meng, Beijing (CN); Zhenghong Wang, Beijing (CN); Yuqing Li, Beijing (CN); Hongjing Sun, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/884,338

(22) Filed: Jan. 30, 2018

(65) Prior Publication Data
US 2018/0162301 A1 Jun. 14, 2018

Related U.S. Application Data

(63) Continuation of application No. PCT/CN2016/111748, filed on Dec. 23, 2016.

(30) Foreign Application Priority Data

Dec. 24, 2015 (CN) ...................... 2015 2 1105561 U
Jan. 29, 2016 (CN) ...................... 2016 2 0093120 U
Mar. 1, 2016 (CN) ...................... 2016 2 0159439 U

(51) Int. Cl.
*B60R 16/037* (2006.01)
*B60R 25/24* (2013.01)
(Continued)

(52) U.S. Cl.
CPC ........ *B60R 16/037* (2013.01); *B60R 16/0237* (2013.01); *B60R 25/24* (2013.01);
(Continued)

(58) Field of Classification Search
CPC ... B60R 16/037; B60R 16/0237; B60R 25/24; B60R 25/241; B60R 25/243; G01S 19/13;
(Continued)

(56) References Cited

U.S. PATENT DOCUMENTS 6,392,534 B1   5/2002  Flick
6,663,010 B2*  12/2003 Chene ................ B60H 1/00642
                                                          236/51

(Continued)

FOREIGN PATENT DOCUMENTS

CN    201965747 U    9/2011
CN    202745589 U    2/2013
(Continued)

OTHER PUBLICATIONS

International Search Report for PCT/CN2016/111748 dated Mar. 24, 2017, 4 pages.
(Continued)

*Primary Examiner* — Richard A Goldman
(74) *Attorney, Agent, or Firm* — Metis IP LLC

(57) ABSTRACT

The present disclosure relates to an electronic device configured to send a service request of a service to a remote server; receive an authority from the remote server; and control, according to the authority, an on-board device mounted on a target vehicle that is assigned by the remote server to provide the service to a user associated with the electronic device.

7 Claims, 4 Drawing Sheets

(51) Int. Cl.
| | |
|---|---|
| *B60R 16/023* | (2006.01) |
| *G01S 19/13* | (2010.01) |
| *G06Q 50/30* | (2012.01) |
| *G07C 5/00* | (2006.01) |
| *H04L 29/08* | (2006.01) |
| *G07C 9/00* | (2006.01) |
| *H04L 12/40* | (2006.01) |

(52) U.S. Cl.
CPC .............. *G01S 19/13* (2013.01); *G06Q 50/30* (2013.01); *G07C 5/008* (2013.01); *G07C 9/00309* (2013.01); *G07C 9/00571* (2013.01); *H04L 67/12* (2013.01); *B60R 2325/205* (2013.01); *G07C 2009/00769* (2013.01); *H04L 2012/40273* (2013.01)

(58) Field of Classification Search
CPC .... G06Q 50/30; G06Q 30/06; G06Q 30/0645; G07C 5/008; H04L 67/12; H04L 2012/40273; H04L 63/062; H04L 63/063; H04L 67/306; H04W 12/00; H04W 12/04; H04W 12/06; H04W 12/08
USPC ............... 701/2, 36, 49; 340/5.72; 705/5, 13
See application file for complete search history.

(56) References Cited

U.S. PATENT DOCUMENTS

| | | | |
|---|---|---|---|
| 6,873,824 B2 | 3/2005 | Flick | |
| 7,289,611 B2* | 10/2007 | Iggulden | B60R 16/0231 379/102.03 |
| 8,224,313 B2* | 7/2012 | Howarter | B60R 25/2009 455/414.1 |
| 8,386,177 B2* | 2/2013 | Wu | G06Q 10/06 701/519 |
| 8,452,673 B2 | 5/2013 | Boling et al. | |
| 8,498,757 B2* | 7/2013 | Bowden | B60W 50/085 340/426.13 |
| 8,736,438 B1* | 5/2014 | Vasquez | B60R 25/24 340/426.11 |
| 8,768,565 B2* | 7/2014 | Jefferies | G07B 15/00 701/29.6 |
| 9,194,168 B1* | 11/2015 | Lu | E05F 15/70 |
| 9,275,501 B2* | 3/2016 | Gross | G07C 5/008 |
| 9,283,856 B2* | 3/2016 | Huntzicker | B60L 11/1809 |
| 9,643,619 B2* | 5/2017 | Sinaguinan | B60W 50/0098 |
| 9,646,428 B1* | 5/2017 | Konrardy | H04W 4/90 |
| 9,704,313 B2* | 7/2017 | Bhandari | G07C 9/00103 |
| 9,725,069 B2* | 8/2017 | Krishnan | H04W 4/80 |
| 9,807,172 B2* | 10/2017 | Fan | H04L 67/12 |
| 9,845,071 B1* | 12/2017 | Krishnan | G07C 9/00182 |
| 9,870,696 B2* | 1/2018 | Aich | G08B 25/08 |
| 9,971,348 B1* | 5/2018 | Canavor | G01C 21/3617 |
| 2001/0027378 A1* | 10/2001 | Tennison | G01M 17/00 701/482 |
| 2009/0306834 A1* | 12/2009 | Hjelm | H04L 12/2809 701/1 |
| 2011/0060480 A1* | 3/2011 | Mottla | G06Q 10/02 701/2 |
| 2011/0112969 A1* | 5/2011 | Zaid | G06Q 10/02 705/50 |
| 2011/0215901 A1* | 9/2011 | Van Wiemeersch | B60R 25/04 340/5.54 |
| 2012/0041633 A1* | 2/2012 | Schunder | B60K 35/00 701/29.2 |
| 2012/0041675 A1* | 2/2012 | Juliver | G06Q 10/08 701/465 |
| 2012/0130627 A1* | 5/2012 | Islam | G06Q 10/08 701/300 |
| 2012/0253552 A1* | 10/2012 | Skelton | B60K 28/063 701/2 |
| 2012/0303178 A1* | 11/2012 | Hendry | B60R 16/037 701/2 |
| 2013/0069761 A1* | 3/2013 | Tieman | G07C 9/00119 340/5.64 |
| 2013/0103779 A1* | 4/2013 | Bai | H04L 67/2833 709/213 |
| 2014/0129053 A1* | 5/2014 | Kleve | B60R 25/24 701/2 |
| 2014/0129113 A1* | 5/2014 | Van Wiemeersch | F02D 28/00 701/102 |
| 2014/0129301 A1* | 5/2014 | Van Wiemeersch | G07B 15/02 705/13 |
| 2014/0156111 A1* | 6/2014 | Ehrman | G06Q 30/0645 701/2 |
| 2014/0278599 A1* | 9/2014 | Reh | B60R 25/24 705/5 |
| 2014/0293753 A1* | 10/2014 | Pearson | G08C 23/02 367/197 |
| 2015/0048927 A1* | 2/2015 | Simmons | G07C 9/00309 340/5.61 |
| 2015/0149023 A1* | 5/2015 | Attard | B60W 30/182 701/28 |
| 2015/0149042 A1* | 5/2015 | Cooper | B60R 16/037 701/48 |
| 2015/0160023 A1* | 6/2015 | Goel | G08G 1/0112 701/400 |
| 2015/0294518 A1* | 10/2015 | Peplin | B60R 25/23 340/5.22 |
| 2015/0356792 A1 | 12/2015 | Dietz et al. | |
| 2015/0358387 A1* | 12/2015 | Smereka | B60K 35/00 715/740 |
| 2015/0363986 A1* | 12/2015 | Hoyos | G07C 9/00563 340/5.61 |
| 2016/0125735 A1* | 5/2016 | Tuukkanen | G08G 1/09 701/23 |
| 2016/0155335 A1* | 6/2016 | Backof, II | G08G 1/20 701/516 |
| 2016/0358145 A1* | 12/2016 | Montgomery | G06F 17/30867 |
| 2017/0083345 A1* | 3/2017 | Sol | H04W 4/008 |
| 2017/0118023 A1* | 4/2017 | Gussen | G06F 8/65 |
| 2017/0267256 A1* | 9/2017 | Minster | G01C 21/3461 |
| 2017/0285642 A1* | 10/2017 | Rander | B60N 2/0244 |
| 2017/0349027 A1* | 12/2017 | Goldman-Shenhar | B60H 1/00742 |
| 2018/0056903 A1* | 3/2018 | Mullett | B60R 16/037 |
| 2018/0203451 A1* | 7/2018 | Cronin | G05D 1/02 |
| 2018/0218470 A1* | 8/2018 | Belwafa | G06Q 10/02 |
| 2018/0222414 A1* | 8/2018 | Ihlenburg | B60H 1/00657 |

FOREIGN PATENT DOCUMENTS

| | | |
|---|---|---|
| CN | 103347072 A | 10/2013 |
| CN | 103364001 A | 10/2013 |
| CN | 103679845 A | 3/2014 |
| CN | 104517455 A | 4/2015 |
| CN | 104698949 A | 6/2015 |
| CN | 204496580 U | 7/2015 |
| CN | 103456146 B | 4/2016 |
| CN | 205609009 U | 9/2016 |

OTHER PUBLICATIONS

Written Opinion of the International Search Authority for PCT/CN2016/111748 dated Mar. 24, 2017, 5 pages.
Partial Search Report in Europen Application No. 16877792.8 dated Nov. 2, 2018, 13 pages.
Examination report No. 1 for Australian Patent Application No. 2016377735 dated Jan. 4, 2019. 5 pages.

\* cited by examiner

US 10,279,762 B2

SYSTEMS AND METHODS FOR USING MOBILE DEVICES TO CONTROL ON-BOARD DEVICES OF VEHICLES

CROSS-REFERENCE TO RELATED APPLICATIONS

This application is a continuation of International Application No. PCT/CN2016/111748, filed on Dec. 23, 2016, which claims priority to Chinese Application No. 201521105561.4, filed on Dec. 24, 2015, Chinese Application No. 201620093120.5, filed on Jan. 29, 2016, and Chinese Application No. 201620159439.3, filed on Mar. 1, 2016, the contents of which are incorporated herein in their entirety by reference.

TECHNICAL FIELD

The present disclosure generally relates to technology field of intelligent transportation, and in particular, systems and methods for vehicle management and control.

BACKGROUND

As the development of intelligent transportation, intelligent vehicle, especially intelligent vehicle management and control has become more and more popular. Intelligent vehicle management and control may create a real-time, accurate, and efficient transportation system. The system and method to manage and/or control vehicles are in high demand.

SUMMARY

According to exemplary embodiments of the present disclosure, an electronic device may comprise at least one storage medium and at least one processor; the at least one storage medium includes a set of instructions for controlling an on-board device of a vehicle; and the at least one processor are configured to communicate with the at least one storage medium, wherein when executing the set of instructions, the at least one processor is directed to: send a service request of a service to a remote server; receive an authority from the remote server; and control, according to the authority, an on-board device mounted on a target vehicle that is assigned by the remote server to provide the service to a user associated with the electronic device.

According to other exemplary embodiments of the present disclosure, an electronic device may comprise a state detection module and a tracking module; the state detection module are configured to be on-board connected to a vehicle bus of a vehicle, wherein during operation the state detection module obtains a state of the vehicle through the vehicle bus, and independently send the state of the vehicle to a server remote to the vehicle; the tracking module, wherein during operation, are configured to track a location of the vehicle, and independently send the location to the server.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
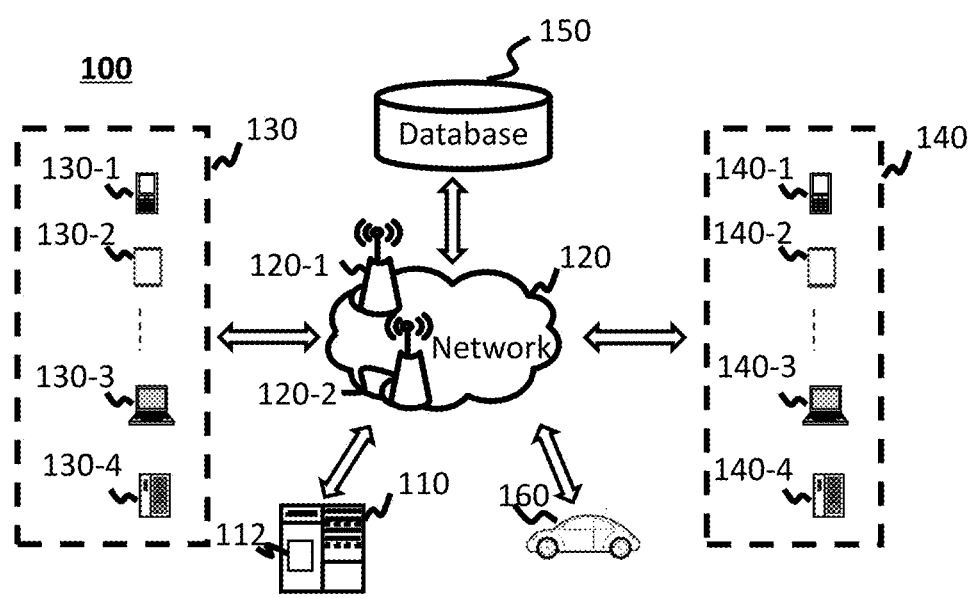
FIG. 1 is a block diagram of an exemplary system for on-demand service according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

Moreover, while the system and method in the present disclosure is described primarily in regard to vehicle management and/or control, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request" in the present disclosure refers to a request that may be initiated by a passenger, a requester, a service requester, a customer, a driver, a provider, a service provider, a supplier, or the like, or any combination thereof. The request may be accepted by any one of a passenger, a requester, a service requester, a customer, a driver, a provider, a service provider, or a supplier. The request may be chargeable, or free.

The position and/or the location in the present disclosure may be acquired by positioning technology embedded in the passenger terminal. The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

FIG. 1 is a block diagram of an exemplary system 100 as an online platform for on-demand service according to some embodiments. For example, the on-demand service system 100 may be an online transportation service platform for transportation services such as taxi hailing, chauffeur service, express car, carpool, bus service, driver hire and shuttle service. System 100 may include a server 110, a network 120, a user terminal 130, a management terminal 140, a database 150, and a vehicle 160.

Server 110 may run the online platform by processing information and/or data relating to the service request. For example, server 110 may assign a target vehicle 160 through the online platform to provide the service to a user. In some embodiments, server 110 may be a single server, or a server group. The server group may be centralized, or distributed (e.g., server 110 may be a distributed system). In some embodiments, server 110 may be local or remote. For example, server 110 may access information and/or data stored in user terminal 130, management terminal 140, and/or database 150 via network 120. As another example, server 110 may be directly connected to user terminal 130, management terminal 140, and/or database 150 to access stored information and/or data. In some embodiments, server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, server 110 may be implemented on a computing device having one or more components illustrated in FIG. 3 in the present disclosure.

In some embodiments, server 110 may include a processing engine 112. Processing engine 112 may process information and/or data relating to the service request to perform one or more functions described in the present disclosure. For example, processing engine 112 may receive a service request of the service from user terminal 130, and/or assign a target vehicle to provide the service to a user of user terminal 130. In some embodiments, processing engine 112 may include one or more processing engines (e.g., single-core processing engine(s) or multi-core processor(s)). Merely by way of example, processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Network 120 may facilitate exchange of information and/or data. In some embodiments, one or more components in system 100 (e.g., server 110, user terminal 130, management terminal 140, and database 150) may send information and/or data to other component(s) in system 100 via network 120. For example, server 110 may obtain/acquire service request from user terminal 130 via network 120. In some embodiments, network 120 may be any type of wired or wireless network, or combination thereof. Merely by way of example, network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, server 110 may include one or more network access points. For example, server 110 may include wired or wireless network access points such as base stations and/or internet exchange points 120-1, 120-2, . . . , through which one or more components of system 100 may be connected to network 120 to exchange data and/or information.

In some embodiments, a user may include a passenger, a driver, or any operator of user terminal 130. In some embodiments, the user of user terminal 130 may be someone other than the passenger and the driver. For example, a user A of user terminal 130 may use user terminal 130 to send a service request for a user B, or receive service and/or information or instructions from server 110. As another example, a user C of user terminal 130 may use user terminal 130 to receive a service request for a user D, and/or information or instructions from server 110. In some embodiments, the term "user" and "user terminal" may be used interchangeably.

In some embodiments, user terminal 130 may include a mobile device 130-1, a tablet computer 130-2, a laptop computer 130-3, a built-in device in a motor vehicle 130-4, or the like, or any combination thereof. In some embodiments, mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smart-phone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. Merely by way of example, user terminal 130 may include a controller (e.g., a remote-controller).

In some embodiments, user terminal 130 may be a device with positioning technology for locating the position of the user and/or user terminal 130. In some embodiments, user terminal 130 may communicate with other positioning device to determine the position of the user, and/or user terminal 130. In some embodiments, user terminal 130 may send positioning information to server 110.

In some embodiments, management terminal 140 may be a terminal that manage and/or control at least one vehicle 200. For example, management terminal 140 may be a platform that control several vehicles 200. In some embodiments, management terminal 140 may be similar to, or the same device as user terminal 130.

Database 150 may store data and/or instructions. In some embodiments, database 150 may store data obtained/acquired from passenger terminal 130 and/or driver terminal 140. In some embodiments, database 150 may store data and/or instructions that server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, database 150 may be connected to network 120 to communicate with one or more components in system 100 (e.g., server 110, user terminal 130, management terminal 140, etc.). One or more components in system 100 may access the data or instructions stored in database 150 via network 120. In some embodiments, database 150 may be directly connected to or communicate with one or more components in system 100 (e.g., server 110, passenger terminal 130, management terminal 140, etc.). In some embodiments, database 150 may be part of server 110.

In some embodiments, one or more components in system 100 (e.g., server 110, user terminal 130, management terminal 140, etc.) may have a permission to access database 150. In some embodiments, one or more components in system 100 may read and/or modify information related to the passenger, driver, and/or the public when one or more conditions are met. For example, server 110 may read and/or modify one or more users' information after a service. As another example, management terminal 140 may access information related to the passenger when receiving a service request from user terminal 130, but management terminal 140 may not modify the relevant information of the passenger.

Vehicle 160 may be an object that offers service based on the service request. In some embodiments, vehicle 160 may communicate with one or more components in system 100 (e.g., server 110, user terminal 130, management terminal 140, etc.) through network 120. For example, one or more components in system 100 (e.g., server 110, user terminal 130, management terminal 140, etc.) may communicate with vehicle 160 for controlling vehicle 160. As another example, server 110 may communicate with vehicle 160 for exchanging information (e.g., commands, instructions, information of vehicle 160, etc.). In some embodiments, vehicle 160 may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

In some embodiments, information exchanging of one or more components in system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
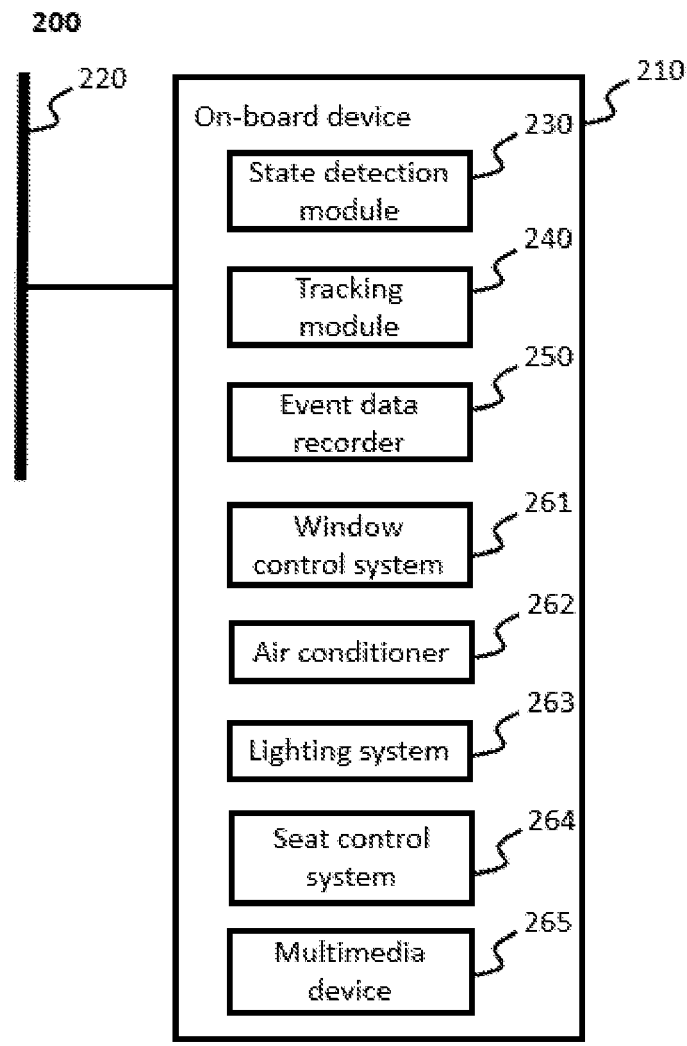
FIG. 2 is a block diagram of an exemplary vehicle in the system illustrated in FIG. 1 according to some embodiments.

FIG. 2 is a block diagram of an exemplary vehicle 200 in the system illustrated in FIG. 1 according to some embodiments. Vehicle 200 may include an on-board device 210 mounted on the vehicle 200, and a vehicle bus 220. On-board device 210 may include a state detection module 230, a tracking module 240, and an event data recorder 250.

State detection module 230 may connect to vehicle bus 220 to obtain a state of vehicle 200. In some embodiments, state detection module 230 may independently send the state of vehicle 200 to server 110 through network 120. In some embodiments, the state of vehicle 200 may include a state in motion, parking, turn-off (flameout), starting, or the like, or any combination thereof. In some embodiments, state detection module 230 may include an On-Board Diagnostics (OBD) module, a vehicle bus module, or the like. Exemplary OBD module may include an Assembly Line Diagnostic Link (ALDL), a Multiplex OBD (M-OBD), an OBD-I, an OBD-II, a European on board diagnostics (EOBD), an Japanese on board diagnostics (JOBD), or the like, or any combination thereof. Exemplary vehicle bus module may include protocols like Controller Area Network (CAN), Domestic Digital Bus (D2B), Avionics Full-Duplex Switched Ethernet (AFDX), Byteflight, an Aeronautical Radio INC (ARINC), FlexRay, Local Interconnect Network (LIN), Media Oriented Systems Transport (MOST), Vehicle Area Network (VAN), Serial Peripheral Interface (SPI), Inter Equipment Bus (IEBus), Inter-Integrated Circuit ($I^2C$), or the like, or any combination thereof. In some embodiments, state detection module 230 may further include a standby battery and an alarm. Exemplary alarm may include a microphone, an indicator light, a loudspeaker, a screen, or the like, or any combination thereof. For example, the alarm may broadcast a section of voice when an abnormal operation occurs.

Tracking module 240 may track a location of vehicle 200. In some embodiments, tracking module 240 may independently send the location of vehicle 200 to server 110 through network 120. In some embodiments, a positioning technology may be used in tracking module 240 to track the location of vehicle 200. For example, the positioning technology may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure. In some embodiments, tracking module 240 may include a GPS module, a GLONASS module, a WiFi positioning module, or the like, or any combination thereof.

In some embodiments, tracking module 240 may further include an acceleration sensor, and a standby battery (not shown). The acceleration sensor may be configured to record an acceleration of vehicle 200. In some embodiments, tracking module 240 may send the acceleration information of vehicle 200 to server 110.

Event data recorder 250 may record internal and external environmental information of vehicle 200. In some embodiments, event data recorder 250 may independently send the internal and external environmental information of vehicle 200 to server 110 through network 120. In some embodiments, the internal and external environmental information may include an internal and/or external hygiene condition, an internal and/or external temperature, an internal and/or external smell, an internal and/or external weather condition, an internal and/or external sound, an external road condition, or the like, or any combination thereof. In some embodiments, event data recorder 250 may record the internal and external environmental information as an image, a video, an audio (sound track), a text, or the like, or any combination thereof. For example, event data recorder 250 may record the external road condition as a video. As another example, event data recorder 250 may record the internal sound as an audio.

In some embodiments, event data recorder 250 may include a camera, a microphone, a memory, a cache, a standby battery, an indicator light, a fingerprint identifier, a sensor (e.g., a smell sensor, a temperature sensor, an acoustic sensor, etc.), or the like, or any combination thereof.

In some embodiments, state detection module 230 may detect state abnormalities of vehicle 200, and/or independently send the state abnormalities to server 110. In embodiments, tracking module 240 may detect a location abnormality of vehicle 200, and/or send the location abnormality to server 110. In some embodiments, event data recorder 250 may detect an internal and/or external environmental abnormality of vehicle 200, and/or send the internal and/or external environmental abnormality to server 110. In some embodiments, server 110 may detect a state abnormality, a location abnormality, and/or an internal and/or external environmental abnormality of vehicle 200. In some embodiments, the abnormal operation may include a removal, an abnormal signal, a fault, etc., of tracking module 240, state detection module 230, and/or event data recorder 250. For example, when tracking module 240 is removed, server 110 may receive an abnormality signal. As another example, when event data recorder 250 is broken, server 110 may receive an abnormality signal.

In some embodiments, server 110 may manage vehicle 200 based on at least one of the state abnormality, the location abnormality, the external and/or internal environmental abnormality, and/or a predetermined rule. In some embodiments, the predetermined rule may be a rule that is determined by the user, the driver, the manager, the online service platform, or the like, or any combination thereof. Vehicle operations, such as ignite, stop, and/or turning off engine, that does not comply with the predetermined rule may be treated as abnormalities. For example, the predetermined rule may stipulate that an engine ignite operation of a vehicle (e.g., a bulldozer) within regular working hours (8 am-6 pm) is normal, but the operation outside the regular working hours is be an abnormal operation. Accordingly, server 110 may so set up the tracking module 240, state detection module 230, and/or event data recorder 250. In some embodiments, the predetermined rule may be varied according to different scenarios. For example, when event data recorder 250 detects that vehicle 200 is starting in a parking lot at a time the vehicle is not supposedly start, server 110 may determine that vehicle 200 is abnormal. Server 110 may send an instruction to tracking module 240 to track the location of vehicle 200. As another example, when the temperature internal vehicle 200 is higher than 50 degrees, server 110 may send an alert to user terminal 130, and/or shut down vehicle 200. As still another example, if the driver of vehicle 200 is a stranger, server 110 may send an instruction to event data recorder 250 to record the internal and/or external environmental information of vehicle 200.

In some embodiments, when an abnormal operation occurs to at least one of state detection module 230, tracking module 240, or event data recorder 250, one or more of the remainder of state detection module 230, tracking module 240, and event data recorder 250 may be triggered to send an alert to server 110. For example, when tracking module 240 is removed, state detection module 230 may detect a state of vehicle 200, and send an abnormal alert of removal of tracking module 240 to server 110. As another example, when event data recorder 250 detects an abnormal signal of internal and/or external environment information, tracking module 240 may be triggered to track a current location of vehicle 200, and send an alert of the abnormal signal to server 110.

In some embodiments, state detection module 230, tracking module 240, and/or event data recorder 250 may communicate with each other. In some embodiments, if vehicle 200 is in a place absent of connections with server 110, when an abnormal operation occurs to any one of state detection module 230, tracking module 240, and event data recorder 250, one or more of the others of state detection module 230, tracking module 240, and event data recorder 250 may be activated from their respective standby statuses, and then send an alert to server 110 at a later time when the wireless connection with server 110 is available. For example, when vehicle 200 is in a network shielding zone, state detection module 230, tracking module 240, and/or event data recorder 250 may not have network connection to the remote server. When tracking module 240 detects a location abnormality of vehicle 200, tracking module 240 may share the location abnormality to state detection module 230, state detection module 230 may be triggered to obtain a current state of vehicle 200, and then send the current state and/or an alert of abnormality of tracking module 240 to server 110 at a later time when vehicle 200 is out of the network shielding zone and resume network connection with the server. As another example, when tracking module 240 is removed, state detection module 230 may be triggered to obtain the state of vehicle 200, and/or send the state to server 110. As still another example, when event data recorder 250 records an external environmental abnormality in a place absent of connection with server 110, state detection module 230 and/or tracking module 240 may be triggered to obtain the state of vehicle 200 and/or track the location of vehicle 200, respectively. The state detection module 230 and/or tracking module 240 then may send an alert, the state and/or the location to server 110 at a later time when connecting with server 110.

In some embodiments, user terminal 130 may be authorized by server 110 to control state detection module 230, tracking module 240, and/or event data recorder 250. In some embodiments, the user of user terminal 130 may be a driver, a passenger, an operator, a manager of vehicle 200. In some embodiments, one vehicle 200 may have more than one user terminal 130 authorized by server 110. For example, the server 110 may authorize both a driver terminal and a passenger terminal of a target vehicle to control state detection module 230, tracking module 240, and/or event data recorder 250. When the passenger enters the vehicle, server 110 may send an authorization to the passenger terminal to directly or indirectly control one or more of control state detection module 230, tracking module 240, and event data recorder 250. In some embodiments, user terminal 130 may send an instruction to instruct server 110 to trigger state detection module 230, tracking module 240, and/or event data recorder 250 to activate according to the authorization. For example, user terminal 130 may send a tracking instruction to server 110 to trigger tracking module 240 to track the location of vehicle 200 through Internet according to the authorization. As another example, user terminal 130 may send a recording instruction to event data recorder 250 to record the temperature internal or external vehicle 200 through Bluetooth or ZigBee according to the authorization. As still another example, when user terminal 130 receives an abnormality of vehicle 200 from server 110 through network 120, user terminal 130 may send an instruction to server 110 to activate state detection module 230, tracking module 240, and/or event data recorder 250.

In some embodiments, user terminal 130 may be associated with vehicle 200. One or more components in on-board device 210 (e.g., state detection module 230, tracking module 240, event data recorder 250, etc.) may send information related to vehicle 200 (e.g., the state, the location, the internal and/or external environmental information of vehicle 200, etc.) to server 110 through network 120. Server 110 may send the information related to vehicle 200 to user terminal 130 associated with vehicle 200. For example, state detection module 230 may send the state of vehicle 200 to server 110, and the server 110 may send the state of vehicle 200 to user terminal 130 through Bluetooth or ZigBee. As another example, tracking module 240 may send the location abnormality to server 110, and server 110 may send the location abnormality to user terminal 130 through Internet.

In some embodiments, management terminal 140 may receive an authority from server 110, and upon authorized by server 110, receive information related to one or more vehicles during operation from server 110. In some embodiments, the one or more vehicles may be not associated with management terminal 140. In some embodiments, one or more components in on-board device 210 (e.g., state detection module 230, tracking module 240, event data recorder 250, etc.) may send information related to vehicle 200 (e.g., the state, the location, the internal and/or external environmental information of vehicle 200, etc.) to server 110 and/through network 120. Server 110 may also send the information related to vehicle 200 to management terminal 140. For example, state detection module 230 may send the state of vehicle 200 to server 110 through Bluetooth or ZigBee, and server 110 may send the state of vehicle 200 to management terminal 140. As another example, tracking module 240 may send the location abnormality to server 110, and server 110 may send the location abnormality to management terminal 140 through Internet.

In some embodiments, management terminal 140 may receive an authority from server 110, and upon authorized by server 110, send an instruction to server 110, and/or on-board device 210 (e.g., state detection module 230, tracking module 240, event data recorder 250, etc.) to activate one or more components of on-board device through network 120. For example, management terminal 140 may send a tracking instruction to server 110 to trigger tracking module 240 to track the location of vehicle 200 through Internet. As another example, management terminal 140 may send a recording instruction to event data recorder 250 to record the temperature internal or external vehicle 200 through Bluetooth or ZigBee. As still another example, when management terminal 140 receives an abnormality of vehicle 200 from server 110 through network 120, management terminal 140 may send an instruction to server 110 to activate state detection module 230, tracking module 240, and/or event data recorder 250.

For illustration purpose, system 100 may implement procedures in the following three application scenarios described below:

When user terminal 130 (driver terminal) loses contact with vehicle 200, server 110 may send a tracking instruction to tracking module 240. Tracking module 240 may track a current location of vehicle 200, and send the current location to server 110. The acceleration sensor may also obtain an acceleration of vehicle 200, and send the acceleration to server 110. Tracking module 240 may communicate with event data recorder 250 to trigger event data recorder 250 to obtain internal and external environmental information. The internal and external environmental information may be sent to server 110. When any abnormality occurs, server 110, user terminal 130, and/or management terminal 140 may manage vehicle 200 based on a predetermined rule.

When vehicle 200 starts, state detection module 230 may detect a state of vehicle 200, and send the state to server 110. Server 110 may obtain an operating state (e.g., "on" status, "off" status, etc.) of user terminal 130, event data recorder 250 may send the internal and external environmental information to server 110. Server 110 may confirm the following information based on a predetermined rule, for example, whether the driver is a target driver, whether it is clean and tidy internal vehicle 200, whether the temperature internal vehicle 200 is within a predetermined range, whether there is a peculiar smell internal vehicle 200, or the like, or any combination thereof. Event data recorder 250 may also send the external environment information (e.g., whether vehicle 200 is inside a target area) to server 110. When any abnormality occurs (e.g., when the vehicle is ignited/turned off in a way that falls into the predetermined rule), server 110, user terminal 130, and/or management terminal 140 may manage vehicle 200 based on the predetermined rule.

When user terminal 130 sends a stop state of vehicle 200, server 110 may send instructions to state detection module 230, and/or event data recorder 250. Server 110 may obtain the state (e.g., whether vehicle 200 has shut down), and/or the internal and external environmental information. When any abnormality occurs, server 110, user terminal 130, and/or management terminal 140 may manage vehicle 200 based on a predetermined rule.

In some embodiments, tracking module 240 may be integrated into state detection module 230, or vice versa. For example, a GPS module may be integrated into an OBD module. The OBD module may communicate with server 110 through network 120. An OBD interface of the OBD module may be connected to vehicle bus 220. In some embodiments, the OBD module may obtain a state of GPS module, a location of vehicle 200, and/or a state of vehicle 200 through the OBD interface. In some embodiments, the OBD module may detect an abnormality, and send the abnormality to server 110, user terminal 130, and/or management terminal 140. In some embodiments, the abnormality may include a state abnormality of GPS module, a location abnormality of vehicle 200, a state abnormality of vehicle 200, or the like, or any combination thereof. For example, the abnormality may be a removal of GPS module.

In some embodiments, server 110, user terminal 130, and/or management terminal 140 may manage and/or control vehicle 200 based on a predetermined rule and/or the abnormality. For example, server 110, user terminal 130, and/or management terminal 140 may send a flameout instruction to OBD module, the OBD module may control vehicle 200 to shut down through vehicle bus 220. In some embodiments, the OBD module may further include a control unit. The control unit may control vehicle 200. For example, the control unit may control the window of vehicle 200 to open and/or close through vehicle bus. As another example, the control unit may control the air conditioner of vehicle 200 to regulate the temperature through vehicle bus.

In some embodiments, server 110 and/or the OBD module may send an alert of the abnormality to user terminal 130, and/or management terminal 140 through network 120. For example, the OBD module may send the alert to management terminal 140 through Bluetooth. As another example, server 110 may send the alert to user terminal 130 through GSM network.

In some embodiments, on-board device 210 may further include any device inside vehicle 200. For example, the on-board device may include an air conditioner, a multimedia, a window device, a lighting system, or a window control system, or the like, or any combination thereof.

Figure 3:
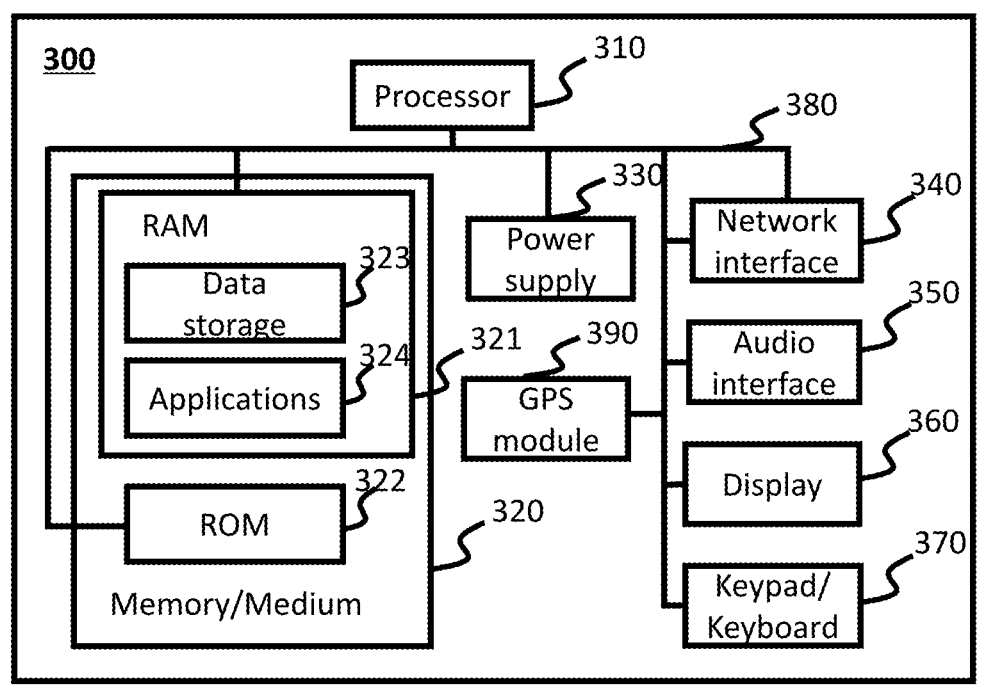
FIG. 3 is a block diagram of an exemplary electronic device according to some embodiments.

FIG. 3 is a block diagram of an exemplary electronic device 300 according to embodiments of the present disclosure. The electronic device 300 may serve as server 110, on-board device 200, user terminal 130, management terminal 140, state detection module 230, tracking module 240, and/or event data recorder 250. Accordingly, functions performed by server 110, user terminal 130, management terminal 140, state detection module 230, tracking module 240, and/or event data recorder 250 described in the present disclosure may be implemented using similar or the same hardware and/or configuration as electronic device 300. Electronic device 300 may include a processor 310, a memory/medium 320, a power supply 330, a network interface 340, an audio interface 350, a display 360, a keypad/keyboard 370, a bus 380, and a GPS module 390.

Bus 380 may transfer information and/or data between one or more components of electronic device 300. For example, bus 380 may connect processor 310 with memory/medium 320 (e.g., RAM 321, ROM 322, etc.) for exchanging information and/or data. In some embodiments, bus 380 may include a hardware component and/or a software implementation. For example, bus 380 may include a wire, an optical fiber, a cable, a communication protocol, or the like, or any combination thereof.

Processor 310 may execute instructions and/or data to perform one or more functions described in the present disclosure. For example, processor 310 may send a service request of service to an online service platform. As another example, processor 310 may receive an authority to control an on-board device mounted on a target vehicle that is assigned by the online platform to provide the service to a user of the electronic device 300. As still another example, processor 310 may instruct the on-board device to perform a predetermined operation according to the authority. In some embodiments, processor 310 may include one or more processors (e.g., single-core processor(s) or multi-core processor(s)). Merely by way of example, processor 310 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Memory/medium 320 may store data and/or instructions that may perform one or more functions described in the present disclosure. For example, memory/medium 320 may store instructions executed by processor 310 to send a service request of service to an online service platform. As another example, memory/medium 320 may store instructions executed by processor 310 to receive an authority to control an on-board device mounted on a target vehicle that is assigned by the online platform to provide the service to a user of the electronic device 300. In some embodiments, memory/medium 320 may include a random access memory (RAM) 321, and a read-only memory (ROM) 322. In some embodiments, RAM 321 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, ROM 322 may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, or the like, or any combination thereof. In some embodiments, RAM 321 may include a data storage 323, and an application 324. In some embodiments, data storage 323 may be any hardware or software for storing data, including a circuitry, a program, etc. In some embodiments, application 324 may include a traveling application, a vehicle scheduling application, a map application, a payment application, an instant messaging application, or the like, or any combination thereof. In some embodiments, memory/medium 320 may include other storage including a mass storage (e.g., a magnetic disk, an optical disk, a solid-state drive, etc.), a removable storage (e.g., a flash drive, a floppy disk, an optical disk, a memory card, a zip disk, a magnetic tape, etc.), etc.

Power supply 330 may supply electric energy for electronic device 300 (or one or more components of electronic device 300). In some embodiments, power supply 330 may include a direct current (DC) power supply, an alternating current (AC) power supply, a switched-mode power supply, a programmable power supply, an uninterruptible power supply, a high voltage power supply, or any hardware or software that can supply electric energy, or any combination thereof.

Network interface 340 may be interface with network 120 and/or one or more device in system 100 and/or on-board device 210 (e.g., server 110, user terminal 130, management terminal 140, database 150, state detection module 230, user tracking module 240, event data recorder 250, etc.). In some embodiments, network interface 340 may be any type of wired or wireless network interface. Merely by way of example, network interface 340 may include a cable network interface, a wireline network interface, an optical fiber network interface, a tele communications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, network interface 340 may be implemented according to programming and/or computer language(s). Network interface 340 may include circuitry for coupling electronic device 300 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

Audio interface 350 may be a device for exchanging audio information or signal. In some embodiments, a user (e.g., a passenger, a driver, an operator, a manager, etc.) may input an audio via audio interface 350. In some embodiments, electronic device 300 may output an audio to a user (e.g., a passenger, a driver, an operator, a manager, etc.) via audio interface 350. The audio may include information related to service request, condition, position, time, or the like, or any combination thereof. In some embodiments audio interface 350 may include a Sony/Philips digital interface format (S/PDIF), a Radio Corporation of America (RCA) connector, a phone connector, a Alesis digital audio tape (ADAT), an Audio Engineering Society/European broadcasting union interface (AES/EBU), a bayonet Neill-Concelman (BNC) interface, or the like, or any combination thereof.

Display 360 may be an output device for presenting information in visual form. In some embodiments, display 360 may display any information in a process for controlling an on-board device mounted on a target vehicle. For example, display 360 may display service request for a user (e.g., a passenger, a driver, an operator, a manager, etc.). As another example, display 360 may display position information for passengers, drivers, managers, etc. As still another example, display 360 may display a control interface on user terminal 130, and/or management terminal 140. In some embodiments, display 360 may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof.

Keypad/keyboard 370 may be an input device for typing in information from a user. In some embodiments, a user (e.g., a passenger, a driver, an operator, a manager, etc.) may input any information in the process for controlling the on-board device. For example, a user (e.g., a passenger, a driver, an operator, a manager, etc.) may input information related to service request, condition, position, time, etc., via keypad/keyboard 370. As another example, a user (e.g., a passenger, a driver, an operator, a manager, etc.) may input an instruction for controlling the on-board device. In some embodiments, keypad/keyboard 370 may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

GPS module 390 may determine a geographical location of electronic device 300. In some embodiments, GPS module 390 may communicate with a GPS satellite to receive location information and/or temporal information of electronic device 300. In some embodiments, GPS module 390 may determine the position of the passenger, user terminal 130, the driver, and/or management terminal 140. In some embodiments, GPS module 390 may include a hardware (e.g., a chip, a circuit, etc.), and/or a software (e.g., an application, a program, etc.). In some embodiments, the application may include a traveling application, a vehicle scheduling application, a map application, an instant messaging application, or the like, or any combination thereof.

In some embodiments, electronic device 300 may further include other input/output component(s). For example, electronic device 300 may further include a handwritten input device, an image input device, a voice input device, an electromagnetic wave input device, a gesture input device, a motion (shake/rotate/tilt) input device, or the like, or any combination thereof.

Figure 4:
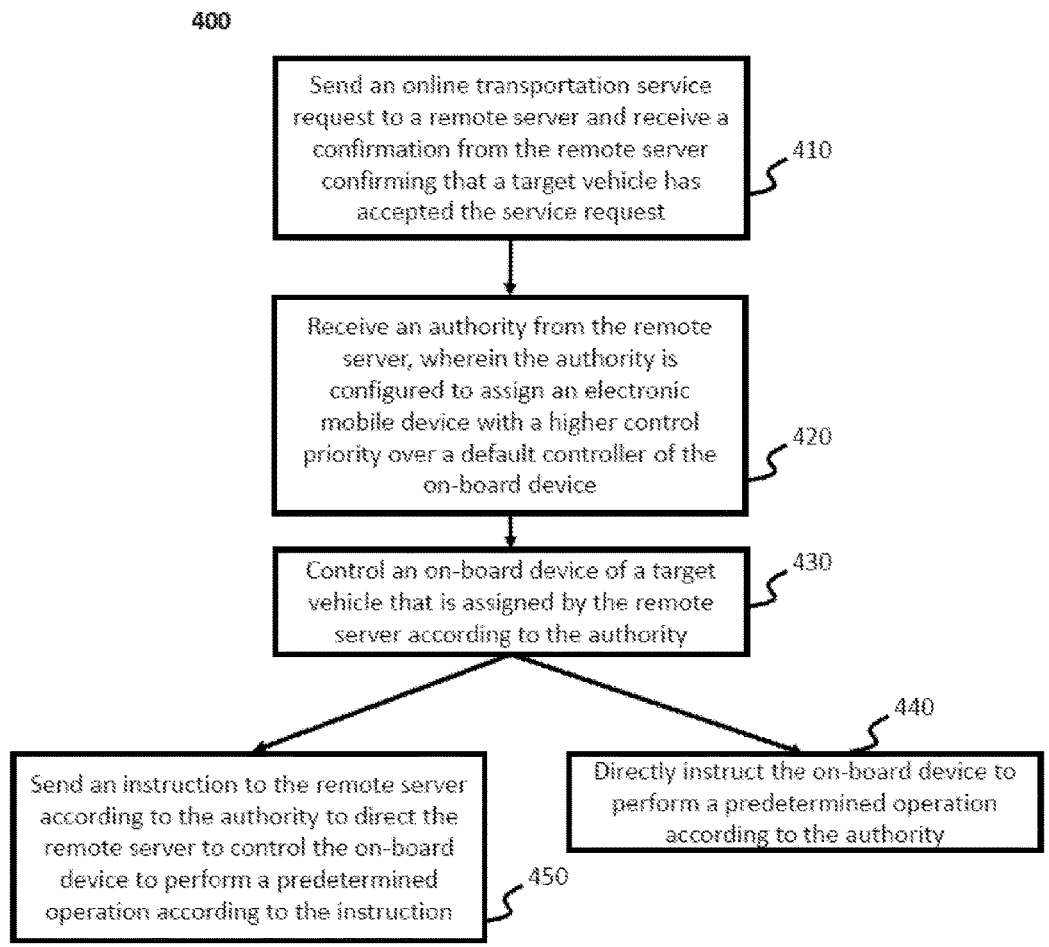
FIG. 4 is a flowchart of an exemplary process for a user terminal to control an on-board device when requesting for a service according to some embodiments.

FIG. 4 is a flowchart of an exemplary process 400 for a user terminal to control an on-board device when requesting for a service from server 110 according to some embodiments. In some embodiments, process 400 may be implemented in user terminal 130 in system 100 illustrated in FIG. 1, or electronic device 300 illustrated in FIG. 3. Process 400 may be stored in memory/medium 320 as a form of instructions and/or an application, and invoked and/or executed by processor 310.

In step 410, processor 310 may send a service request of the service to server 110.

In some embodiments, server 110 may send the service request to at least one vehicles 160 (or at least one driver terminal associated with the at least one vehicles 160). A target vehicle (or a target driver terminal associated with the target vehicle) may accept the service request to provide the service to the user of electronic device 300, and/or user terminal 130. In some embodiments, processor 310 may receive a confirmation that the target vehicle has accepted the service request from the user.

In step 420, processor 310 may receive an authority from server 110.

In step 430, processor 310 may control an on-board device mounted on the target vehicle that is assigned by server 110 to provide the service to the user of electronic device 300, and/or user terminal 130 according to the authority.

In some embodiments, the user may be a passenger of the target vehicle. In some embodiments, the authority is configured to assign electronic device 300, and/or user terminal 130 with a higher control priority over a default controller of the on-board device. The default controller of the on-board device may be an original device mounted on vehicle 200 to control one or more devices of vehicle 200 (e.g., an air conditioner, a multimedia device, a window controlling system, a seat controlling system, and/or the on-board device as shown in FIG. 2, etc.). For example, when processor 310 receives an authority to control the on-board device, the electronic device may take control of the on-board device from the default controller (e.g., a button on the on-board device, a switch mounted on vehicle 200, a knob mounted on vehicle 200, etc.) and/or have a higher authority than the default controller in controlling the on-board device.

In step 440, processor 310 may instruct the on-board device to perform a predetermined operation according to the authority.

In some embodiments, the predetermined operation may be any control operation of the on-board device of target vehicle, include a turning on operation, a turning off operation, a setting operation, an adjusting operation, or the like, or any combination thereof. In some embodiments, the predetermined operation may not affect safe driving. For example, the predetermined operation may not control the on-board device like an engine, a windshield wiper, a steering wheel, or the like, or any combination thereof.

In some embodiments, processor 310 may directly instruct the on-board device to perform the predetermined operation according to the authority. For example, processor 310 may directly control the window controlling system on the target vehicle to open the window through Bluetooth connection. As another example, processor 310 may directly control the air conditioning system on the target vehicle to turn off the air conditioner through ZigBee connection. In some embodiments, processor 310 may control the on-board device via a control device. The control device may include a receiver, a servo, and a protocol converter internal or external to the on-board device. In some embodiments, the receiver may include a Bluetooth chip (e.g., a CRS chip, a BCM chip, a MTK chip, etc.), a ZigBee module, or the like, or any combination thereof. In some embodiments, the protocol converter may include a chip including an Acorn RISC Machine (also known as Advanced RISC Machine, ARM for short) architecture. The protocol converter may convert the protocol between processor 310 and the on-board device. For example, the protocol converter may convert a protocol of the instruction from processor 310 to a bus protocol of the instruction that the on-board device recognizes. The bus protocol may be send to the OBD interface to control the on-board device. In some embodiments, the bus protocol may include Controller Area Network (CAN), Domestic Digital Bus (D2B), Avionics Full-Duplex Switched Ethernet (AFDX), Byteflight, an Aeronautical Radio INC (ARINC), FlexRay, Local Interconnect Network (LIN), Media Oriented Systems Transport (MOST), Vehicle Area Network (VAN), Serial Peripheral Interface (SPI), Inter Equipment Bus (IEBus), Inter-Integrated Circuit ($I^2C$), or the like, or any combination thereof. The servo may choose at least one protocol converter to perform the protocol conversion.

In some embodiments, processor 310 may send an instruction to server 110 according to the authority to render to server 110 to direct the on-board device to perform the predetermined operation. For example, processor 310 may send an instruction of closing the window to server 110 through cellular network according to the authority. The on-board device may be directed to close the window. As another example, processor 310 may send an instruction of playing the radio to server 110 through GSM according to the authority. The on-board device may be directed to play the radio.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A mobile device for controlling an on-board device of a target vehicle, the mobile device comprising:
   at least one storage medium including a set of instructions for controlling an on-board device of a target vehicle;
   at least one network interface to communicate with a remote server via a network; and
   logic circuits coupled to the at least one network interface, wherein during operation, the logic circuits communicate with the at least one storage medium and execute the set of instructions to:
      send, via the at least one network interface, signals including a service request of an online on-demand transportation service to the remote server;
      receive, via the at least one network interface from the remote server, signals including an authority to control the on-board device mounted on the target vehicle operated by a third-party driver; and
      control, according to the authority, the on-board device mounted on the target vehicle that is assigned by the remote server to provide the online on-demand transportation service to a user associated with the mobile device.

2. The mobile device according to claim 1, wherein the online on-demand transportation service is a driving service, and
   the logic circuits further execute the set of instructions to:
      directly instruct the on-board device to perform a predetermined operation according to the authority.

3. The mobile device according to claim 1, wherein the logic circuits further execute the set of instructions to:
   send electronic signals including an instruction to the remote server according to the authority, wherein the instruction is configured to direct the remote server to control the on-board device to perform a predetermined operation according to the instruction.

4. The mobile device according to claim 1, wherein the service is an online transportation service provided by the target vehicle; and
   the user is a passenger of the target vehicle.

5. The mobile device according to claim 1, wherein the logic circuits further execute the set of instructions to to receive signals including a confirmation, from the remote server, confirming that the target vehicle has accepted the service request from the user.

6. The mobile device according to claim 1, wherein the authority is configured to assign the electronic mobile device with a higher control priority over a default controller of the on-board device.

7. The mobile device according to claim 1, wherein the on-board device comprises at least one of an air conditioner, a multimedia device, a lighting system, a window control system, or a seat control system.

\* \* \* \* \*